(12) United States Patent
Chandrashekar

(10) Patent No.: US 11,442,821 B2
(45) Date of Patent: Sep. 13, 2022

(54) BACKUP DATA RESTORATION WITHOUT USER INTERVENTION

(71) Applicant: MICRO FOCUS LLC, Santa Clara, CA (US)

(72) Inventor: Kumar Chandrashekar, Bangalore (IN)

(73) Assignee: MICRO FOCUS LLC, Santa Clara, CA (US)

( * ) Notice: Subject to any disclaimer, the term of this patent is extended or adjusted under 35 U.S.C. 154(b) by 95 days.

(21) Appl. No.: 16/900,103

(22) Filed: Jun. 12, 2020

(65) Prior Publication Data

US 2021/0011815 A1    Jan. 14, 2021

(30) Foreign Application Priority Data

Jul. 10, 2019   (IN) .............................. 201941027720

(51) Int. Cl.
| | |
|---|---|
| G06F 12/00 | (2006.01) |
| G06F 11/14 | (2006.01) |
| G06F 21/62 | (2013.01) |
| G06F 11/07 | (2006.01) |

(52) U.S. Cl.
CPC ...... *G06F 11/1469* (2013.01); *G06F 11/0727* (2013.01); *G06F 11/1451* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 7,475,277 B1 | 1/2009 | Holdman | |
| 7,822,717 B2 | 10/2010 | Kapoor | |
| 8,521,695 B2 | 8/2013 | Zwilling | |
| 8,577,845 B2* | 11/2013 | Nguyen | G06F 11/1451 707/654 |
| 2017/0344442 A1 | 11/2017 | Pawar | |
| 2019/0004888 A1 | 1/2019 | Chagam Reddy | |
| 2019/0188385 A1* | 6/2019 | Selvaraj | G06F 11/1469 |

OTHER PUBLICATIONS

Microsoft; SQL Server 2017; Automatic Page Repair (Availability Groups: Database Mirroring); 2017; 6 Pages.
Niyaz Mohamed; Microsoft Ignite 2018: Come See Best in Class Data Protection for Office 365; Sep. 24, 2018; 3 Pages.
Oracle; Oracle Database, Oracle Active Data Guard, Real-Time Data Protection and Availability; Oracle White Paper; Oct. 2015; 21 pages.

* cited by examiner

*Primary Examiner* — Daniel D Tsui

(57) ABSTRACT

According to examples, an apparatus may include a processor that may automatically restore a backup copy from a remote backup storage system to a user device without a user request to do so. For example, the apparatus may, at various times without user intervention, determine whether a restoration of a backup copy of local data is to be performed based on various criteria for automatically restoring the backup copy without a user request to do so. Based on satisfaction of the criterion, the apparatus may restore the backup copy to the original location of the local data (to immediately replace the local data) and/or to a temporary location accessible to the apparatus (such as via onboard storage) from which the backup copy may replace the local data at a later time (such as on-demand).

20 Claims, 5 Drawing Sheets

400

```
ACCESS DATA, AT A REMOTE APPARATUS, THAT IS TO BE BACKED
UP
402
```
↓
```
CAUSE A BACKUP COPY OF THE DATA TO BE STORED AT THE
BACKUP STORAGE SYSTEM
404
```
↓
```
DETERMINE THAT A RESTORATION OF THE BACKUP COPY TO THE
REMOTE APPARATUS IS TO BE PERFORMED WITHOUT A USER
INTERVENTION THAT REQUESTS THE RESTORATION FROM THE
BACKUP STORAGE SYSTEM
406
```
↓
```
PROVIDE THE BACKUP COPY OF THE DATA TO THE REMOTE
APPARATUS RESPONSIVE TO THE DETERMINATION THAT THE
RESTORATION OF THE BACKUP COPY TO THE REMOTE
APPARATUS IS TO BE PERFORMED
408
```

*FIG. 4*

NON-TRANSITORY MACHINE-READABLE STORAGE MEDIUM
500

DETERMINE THAT LOCAL DATA HAS CHANGED RELATIVE TO A PREVIOUS BACKUP
502

TRANSMIT A BACKUP COPY OF THE LOCAL DATA TO A REMOTE BACKUP STORAGE SYSTEM
504

DETERMINE THAT THE BACKUP COPY IS TO BE RESTORED FROM THE REMOTE BACKUP STORAGE SYSTEM WITHOUT A USER INTERVENTION THAT REQUESTS THAT THE BACKUP COPY IS TO BE RESTORED FROM THE REMOTE BACKUP STORAGE SYSTEM
506

TRANSMIT, TO THE REMOTE BACKUP STORAGE SYSTEM, A REQUEST TO RESTORE THE BACKUP COPY
508

RECEIVE THE BACKUP COPY FROM THE REMOTE BACKUP STORAGE SYSTEM
510

STORE THE BACKUP COPY TO REPLACE THE LOCAL DATA
512

FIG. 5

BACKUP DATA RESTORATION WITHOUT USER INTERVENTION

BACKGROUND

An apparatus, such as a user's client device, may automatically backup local data to a remote backup storage system. In other words, the apparatus may upload, to the remote backup storage system, local data for storage as a backup copy. The backup copy may be restored from the remote backup storage system to the client device when requested by the user.

BRIEF DESCRIPTION OF THE DRAWINGS

Features of the present disclosure may be illustrated by way of example and not limited in the following figure(s), in which like numerals indicate like elements, in which:

FIG. 4 depicts a flow diagram of an example method for automatically restoring backed-up data to an apparatus; and FIG. 5 depicts a block diagram of an example non-transitory machine-readable storage medium for automatically restoring data backed up at a remote backup storage system.

DETAILED DESCRIPTION

Figure 1:
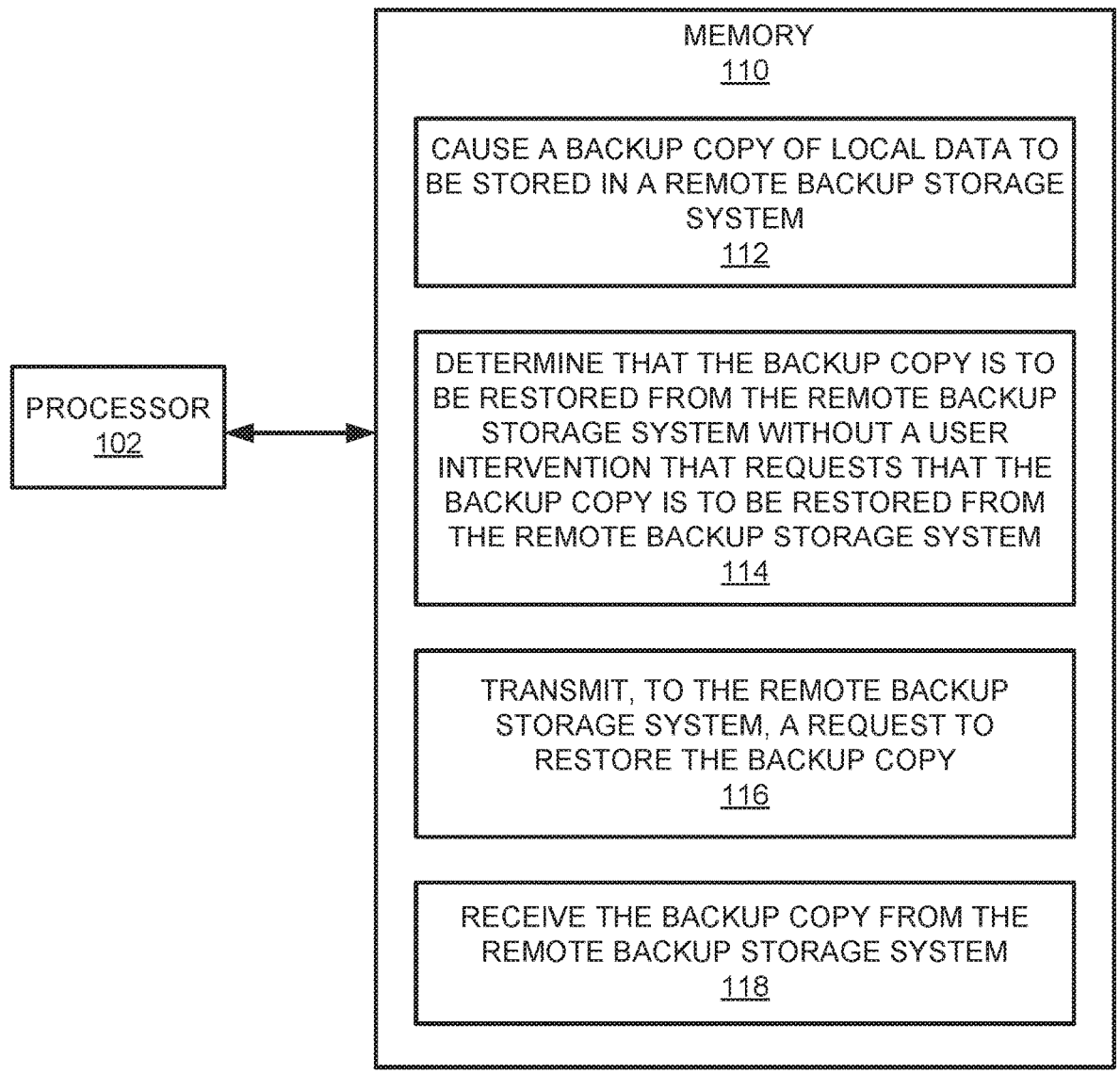
FIG. 1 shows a block diagram of an example apparatus that may automatically restore data backed up at a remote backup storage system.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Disclosed herein are apparatuses and methods to automatically restore backup copies of local data without user intervention. For example, an apparatus may automatically restore a backup copy of local data from a remote backup storage system to a user device without a user request to do so. In this manner, data restoration may be transparent to the user. In some examples, the apparatus may, at various times without user intervention, determine whether a restoration of the backup copy is to be performed. In this way, the backup copy may be restored to the apparatus transparently to the user at appropriate times. In some examples, the apparatus may restore the backup copy to the original location of the local data (to replace the local data). In these examples, the backup copy may immediately replace the local data. For example, if the local data becomes corrupted, is missing, or some other criterion is met for restoring a backup copy, the local data may be immediately replaced by the backup copy without user intervention. In this example, the user may have been unaware of any problem with the local data, which may be resolved automatically through automated restoration.

In some examples, the apparatus may restore the backup copy to a temporary location accessible to the apparatus (such as via onboard storage). In these examples, the apparatus may replace the local data with the backup copy on demand or when otherwise needed. For instance, a user of the apparatus may notice that the local data is corrupt or missing and request that the local data be restored. It should be noted that this user request may occur after the backup copy has already been automatically restored to the temporary location. Instead of accessing the backup copy from the remote backup storage system, the apparatus may access the temporary location to restore the backup copy. In this manner, the user may not be required to wait to download the backup copy from the remote backup storage system and may not require network access for such restoration from the temporary location.

The apparatus may include instructions that may cause a processor of the apparatus to automatically determine whether a backup copy is to be restored from a remote backup storage system without a user request to perform such restoration. The apparatus may make the determination based on various criteria that indicate that the local data is to be restored to a last known good state, which may be represented by the latest backup copy of the local data stored at the remote backup storage system. The various criteria may include, for example, a determination that the local data: has been corrupted and is therefore inaccessible, is missing or inaccessible due to a revocation of access by a virus or other attack, has been encrypted (unintentionally or intentionally such as through Ransomware), should be ported to a new device of a user that replaces a prior device that stored the local data, or has been permanently permanently deleted (such as by accident by the user).

Having described an overview of automatically restoring a backup copy of local data, reference will be made to FIG. 1, which shows a block diagram of an example apparatus 100 that may automatically restore data backed up at a remote backup storage system. It should be understood that the example apparatus 100 depicted in FIG. 1 may include additional features and that some of the features described herein may be removed and/or modified without departing from the scope of the example apparatus 100.

The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

The apparatus 100 may include a memory 110 that may have stored thereon machine-readable instructions (which may also be termed computer readable instructions) 112-118 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations at processor 102 to automatically restore data backed up at a remote backup storage system.

Referring to FIG. 1, the processor 102 may fetch, decode, and execute the instructions 112 to cause a backup copy of local data to be stored in a remote backup storage system. The processor 102 may fetch, decode, and execute the instructions 114 to determine that the backup copy is to be restored from the remote backup storage system without a user intervention that requests that the backup copy is to be restored from the remote backup storage system.

In some examples, to determine that the backup copy is to be restored from the temporary location, the processor 102 may access a user interaction pattern that indicates that the local data was accidentally permanently deleted. In a particular example, the user interaction pattern may be associated with a request to undo an action permanently deleting (in other words, a deletion not being able to be recovered by the user) the local data, indicating that the deletion was accidental. The user interaction pattern may include a keystroke shortcut or other interaction that indicates a permanent deletion should be undone. Such user interaction pattern may include a "control-z" interaction pattern or other type of input that indicates that a permanent deletion operation is to be undone.

The processor 102 may fetch, decode, and execute the instructions 116 to transmit, to the remote backup storage system, a request to restore the backup copy. The processor 102 may fetch, decode, and execute the instructions 118 to receive the backup copy from the remote backup storage system. In some examples, the processor 102 may identify a location of the local data. For example, the local data may include a file that is saved at a file system directory of the apparatus 100. The processor 102 may identify the file system location and store the backup copy to the file system location. In this manner, the backup copy of the local data may be automatically restored to the location of the local data.

In some examples, the processor 102 may identify a temporary location. The temporary location may be at the apparatus 100 (such as in memory 110). The temporary location in these examples may serve as a local storage at which backed-up data is automatically restored for later retrieval. For example, the processor 102 may determine that the backup copy is to be restored from the temporary location. In particular, the processor 102 may determine that the backup copy is to be restored to the location of the local data and determine that the backup copy has been automatically restored to the temporary location. The processor 102 may identify a location of the local data, and restore the backup copy to the location from the temporary location. In these examples, the processor 102 may automatically restore the backup copy to the temporary location so that the backup copy may be restored to the location of the local data (to restore the local data from the backup copy) from the temporary location instead of from a remote storage system. As such, if the backup copy is restored from the remote storage system via a network connection, such network connection may be unnecessary to restore the backup copy from the temporary location.

Figure 2:
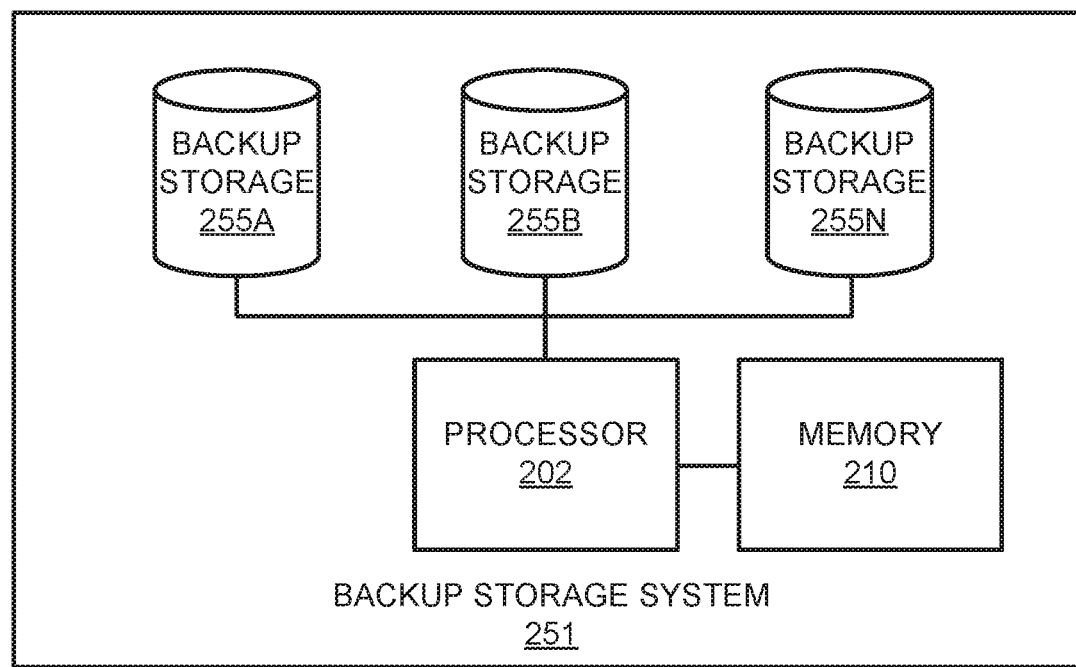
FIG. 2 depicts a data flow in an example system of automatically restoring data backed up at a remote backup storage system.
Figure 2:
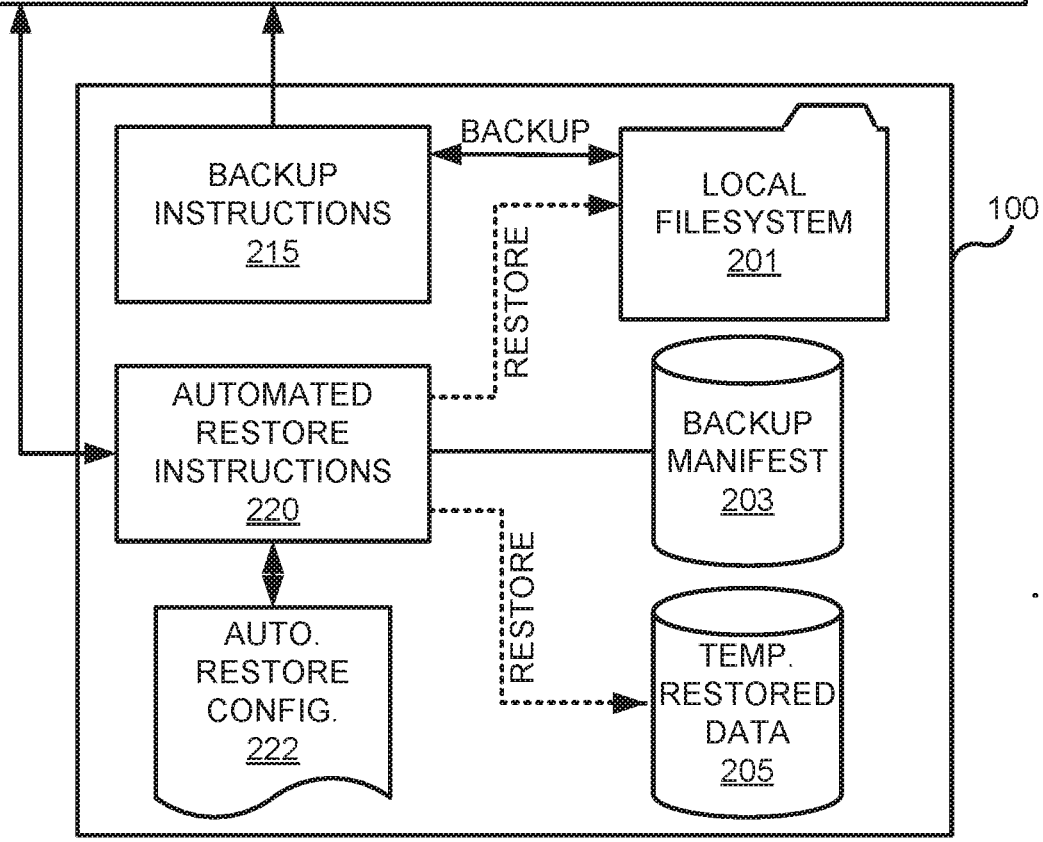

FIG. 2 depicts a data flow in an example system 200 of automatically restoring data backed up at a backup storage system 251. The system 200 may include a backup storage system 251 in communication with the apparatus 100 via a network (not illustrated). The backup storage system 251 may be referred to herein throughout as "remote" relative to the apparatus 100. However, the term "remote" may not necessarily denote that the backup storage system 251 and the apparatus 100 are physically located apart from one another geographically. Rather, in some examples, the apparatus 100 and the backup storage system 251 may be co-located within a given geographic region, such as when the apparatus 100 is brought or otherwise installed within the same geographic region as the backup storage system 251. In some examples, the apparatus 100 and the backup storage system 251 may not be co-located within the same geographic region. The term "remote" therefore may refer to being physically separate from, but connected to one another via a network.

The backup storage system 251 may include a processor 202 and a memory 210 (similar to the processor 102 and the memory 110, respectively, illustrated in FIG. 1). The processor 202 may execute instructions stored in the memory 210 to perform various operations described herein with respect to the backup storage system 251. The backup storage system 251 may include backup storages 255 (illustrated as backup storages 255A-N, in which the variable "N" may represent a value greater than one) at which backup copies of local data from various devices, such as apparatus 100, may be stored. Generally speaking, the processor 202 may process requests to backup, restore, and/or perform other functions relating to remotely backup up data from various devices such as apparatus 100.

The apparatus 100 may include a local filesystem 201, a backup manifest 203, a temporary ("temp.") restored data 205, backup instructions 215, automated restore instructions 220, an automated ("auto.") restore configuration ("config.") 222, and/or other components, any of which may be stored in a memory, such as memory 110.

In some examples, the backup instructions 215 when executed by a processor (such as processor 102) of the apparatus 100 may cause the processor to periodically perform a backup of local data in the local filesystem 201. For example, the backup instructions 215 may discover files in the local filesystem 201 that have not yet been backed up (uploaded to the backup storage system 251), have been modified since the last time that the file was backed up, and/or otherwise is to be backed up. In some examples, when the local data is backed up, the backup instructions 215 may include or update an entry in the backup manifest 203 to indicate that the backup occurred. The backup manifest 203 may include a data structure (which may include a file, database, or other data structure) that indicates local data that has been backed up. For example, the backup manifest 203 may include identify the local data and the backup copy of the local data. For example, the backup manifest 203 may store identifiers (such as file names) of the local data and backup copy. In some examples, the same identifier may be used to identify the local copy and the backup copy. In some examples, using the backup manifest 203, the backup instructions 215 may determine whether, when, and/or in what state the local data was backed up.

Upon a determination that the local data is to be backed up, the backup instructions 215 may upload the local data to the backup storage system 251. For examples in which the apparatus 100 communicates with the backup storage system 251 via a wireless or other network connection that is currently unavailable, the backup instructions 215 may upload the local data for backup when such connection becomes available. Based on the backup operations, the apparatus 100 may provide secure and automated backup of local data from the apparatus 100 to be stored as a backup copy in the backup storage system 251.

In some examples, to restore the backup copy from the backup storage system 251 to the apparatus 100, the backup instructions 215 and/or the backup storage system 251 may cause the processor 102 to provide an interface (not shown) through which a user may request such restoration (i.e., download the backup copy of the local data to the apparatus 100). However, these examples may take time to download the backup copy when the backup copy is needed, may be unavailable if a network connection is unavailable when the backup copy is needed, and/or may require a user to know when the backup copy is needed. To address these and other issues, the automated restore instructions 220 may cause the processor 102 to automatically restore (without a user request to conduct such restoration) the backup copy of the local data from the backup storage system 251 to the apparatus 100.

In some examples, to determine whether to automatically restore a backup copy, the automated restore instructions 220 may cause the processor 102 to identify local data that has been backed up (using, for example, the backup manifest 203) and apply criteria for determining whether to automatically restore the backup copy. The auto restore config. 222 may store the criteria, which may include whether the local data is missing, inaccessible due to a revocation of access by a virus or other attack, corrupted, encrypted, was accidentally permanently deleted, is to be copied to a new device, and/or other criteria. Further examples of criteria and determining whether to automatically restore a backup copy is described with respect to FIG. 3.

When a backup copy of local data is to be restored, the automated restore instructions 220 may cause the processor 102 to automatically restore the backup copy. For example, the automated restore instructions 220 may cause the processor 102 to transmit, to the backup storage system 251, a request to restore the backup copy. Responsive to the request, the backup storage system 251 may provide the backup copy to the automated restore instructions 220 for restoration.

The automated restore instructions 220 may restore the backup copy directly to the location at which the local data resides (such as local filesystem 201) at the apparatus 100 to replace such local data and/or to the temp. restored data 205 from which the backup copy may be later restored on-demand to the location at which the local data resides. In some examples, the location at which to restore the backup copy may be stored as a user-configurable parameter in the auto. restore config. 222. For example, the auto. restore config. 222 may store an indication of whether to restore the backup copy to the location (such as the local filesystem 201) or the temp. restored data 205. Such indication may be user-configurable.

It should be noted that the backup instructions 215 may include the instructions 112-118 illustrated in FIG. 1, the instructions 502-512 illustrated in FIG. 5, and/or other instructions. Furthermore, the auto. restore config. 222 may be stored separately from the automated restore instructions 220 as illustrated or may be integrated within the instructions of the automated restore instructions 220.

Figure 3:
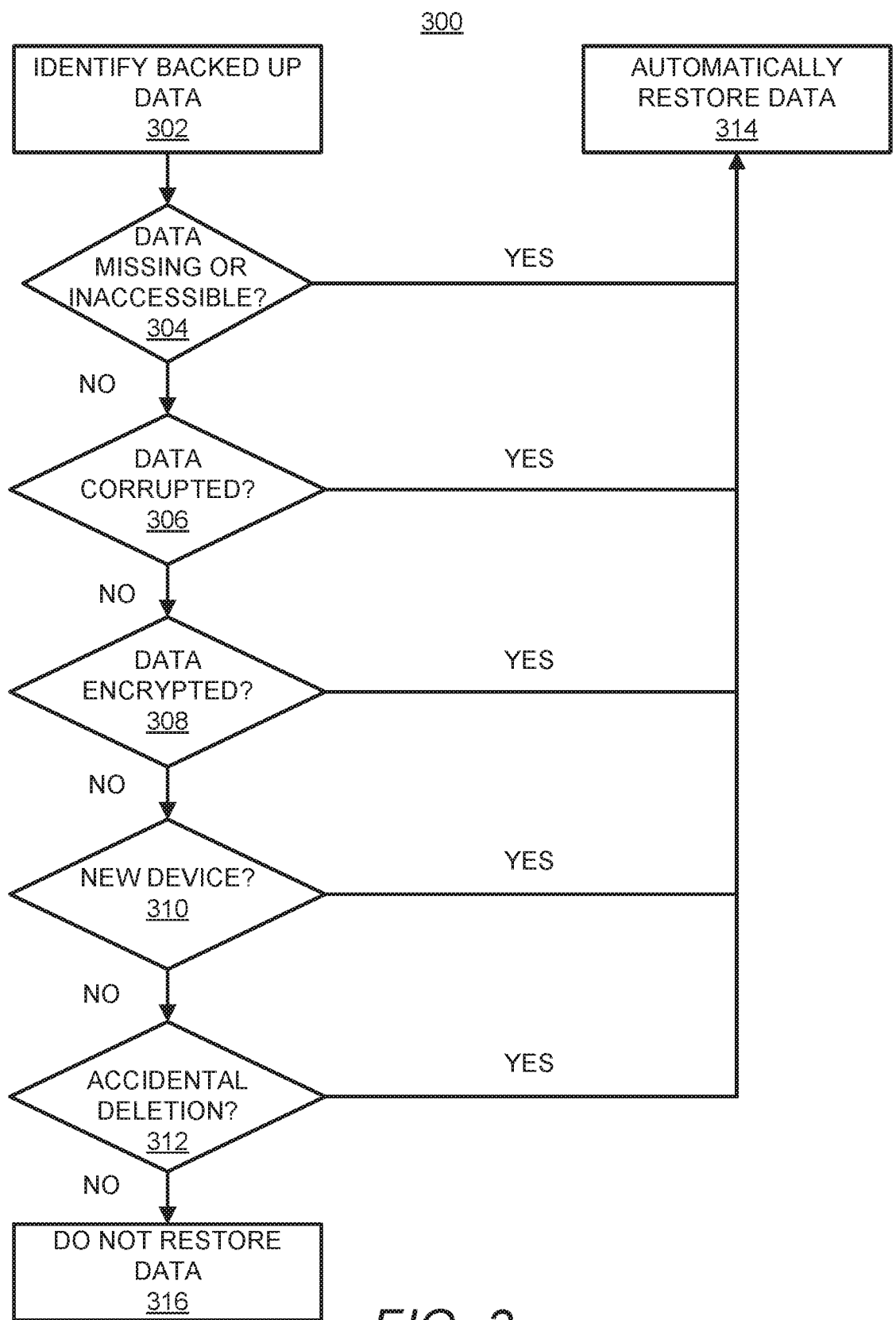
FIG. 3 depicts a flow diagram of an example method for determining whether to automatically restore data backed up at a remote backup storage system.

Various manners in which the apparatus 100 may operate to determine whether to automatically restore data backed up at a remote backup storage system are discussed in greater detail with respect to the method 300 depicted in FIG. 3. It should be understood that the method 300 may include additional operations and that some of the operations described therein may be removed and/or modified without departing from the scopes of the method 300. Furthermore, the various operations illustrated in FIG. 3 and other drawing figures may be re-ordered unless otherwise expressly indicated. The descriptions of the method 300 are made with reference to the features depicted in FIGS. 1 and 2 for purposes of illustration.

FIG. 3 depicts a flow diagram of an example method 300 for determining whether to automatically restore data backed up at a remote backup storage system. As shown in FIG. 3, at block 302, the processor 102 may identify backed-up data (data that has been copied to the backup storage system 251 for backup purposes). For example, the processor 102 may access the backup manifest 203 to identify files or other data that have been backed up to the backup storage system 251. The processor 102 may apply one or more criteria to determine whether a backup copy of data (also referred to in FIG. 3 as simply, "backup copy") is to be automatically restored without a user intervention requesting such backup. Examples of such criteria for determining whether to automatically restore a backup copy without user intervention are described with reference to blocks 304-312. It should be noted that the processor 102 may repeat a given criterion for all backup copies of data of the apparatus 100.

At block 304, the processor 102 may determine whether a local copy of data ("local data") is missing or inaccessible. For example, the processor 102 may determine whether the local data exists at a file location specified by the backup manifest 203 for backed up data. In some examples, the processor 102 may determine that the local data is missing when the local data is no longer at an expected location, such as a location on the local filesystem 201. In some examples, the processor 102 may determine that the local data is inaccessible because access to the local data has been revoked by a virus or other malicious attack. In these examples, the processor 102 may, via an anti-virus application programming interface ("API") (not shown) query an anti-virus vault that may store an indication of such access revocation. Responsive to a determination that the local data does not exist or is otherwise inaccessible, the processor 102 may proceed to block 314, at which the processor may automatically restore the data without user intervention. Otherwise, the processor 102 may proceed to block 306.

At block 306, the processor 102 may determine whether the local data is corrupted. To determine whether the local data is corrupted, the processor 102 may attempt to access the local data. In a particular example, the processor 102 may initiate a file open command or other access command to access the local data. Responsive to a determination that the local data cannot be accessed due to file corruption such as when the file open command returns an indication of an error, the processor 102 may proceed to block 314.

At block 308, the processor 102 may determine whether the local data has been encrypted. For example, the local data may become maliciously encrypted after the local data was previously backed to the backup storage system 251. In particular examples the local data may be encrypted resulting from ransomware or other malicious attacks. In these examples, the processor 102 may determine that the local data has been encrypted based on a measure of entropy of the local data (indicating a level of data density), a chi-square-test that measures a level of data randomness in the local data (in which encrypted data may exhibit uniform randomness), and/or other technique to determine whether data has been encrypted. It should be noted that the processor 102 may not need to identify the type of encryption used—only that the local data has been encrypted and therefore is to be restored from the backup copy. Responsive to a determination that local data has been encrypted, the processor 102 may proceed to block 314, at which the processor may automatically restore the data.

In some examples, the apparatus 100 may include a replacement device that is to replace a prior apparatus that backed up data to the backup storage system 251. The processor 102 may automatically restore the data (from the prior apparatus) backed up to the backup storage system to the apparatus 100. In this manner, when a user replaces a user device with a new device, the new device may automatically restore the previously backed up data for the user device to the new device.

For example, at block 310, the processor 102 may determine whether the apparatus 100 is a new device (that is to replace a prior apparatus). If so, the processor 102 may proceed to block 314, at which the processor may automatically restore the data. To do so in this example, the processor 102 may identify a prior backup copy of prior local data stored at the prior apparatus and determine that the prior backup copy is to be restored from the remote backup storage system without a user intervention that requests that the prior backup copy be restored from the remote backup storage system. The processor 102 may transmit, to the remote backup storage system, a second request to restore the prior backup copy, and receive the prior backup copy from the remote backup storage system.

At block 312, the processor 102 may determine whether an accidental permanent deletion of the local data was performed. For example, the processor 102 may access an indication of a user interaction pattern that indicates that the user accidentally permanently deleted a file. Such user interaction pattern may include a "control-z" input in which a control and z button are simultaneously pressed to indicate an "undo" operation. However, other types of interaction patterns, inputs, gestures, and the like may be used to indicate an undo operation. Responsive to a determination that an accidental permanent deletion of the local data was performed, the processor 102 may proceed to block 314, at which the processor may automatically restore the data.

It should be noted that the user interaction pattern may ordinarily indicate an intent by the user to locally undo an accidental permanent deletion operation (such as via a control-z or other interaction pattern), not a request to restore data from the backup storage system 251 or the temporary restored data 205. However, the processor 102 may access such user interaction pattern to determine that instead of performing an undo operation as originally intended by the user, the processor 102 may automatically restore the relevant data (the subject of the user interaction pattern) from the backup storage system 251 or the temporary restored data 205. If none of the criteria for automatically restoring the data is met, the processor 102 may proceed to block 316, in which the data is not automatically restored.

In some examples, to determine that the backup copy is to be restored from the temporary location, the processor 102 may receive a user request to restore the local data. The processor 102 may receive the user request via a user interface that exposes the data backup operations of the apparatus 100. At block 314, the processor 102 may determine that the backup copy is to be restored from the remote backup storage system. The processor 102 may restore the data by transmitting a request to obtain the latest backup copy of the data to the backup storage system 251. The request may include, for example, an identifier of the data.

Upon receiving the latest backup copy from the backup storage system 251, the processor 102 may write the latest backup copy to the location of the data in the local filesystem 201 or to the temporary restored data 205.

Various manners in which the backup storage system 251 may operate to automatically restore backed-up data to an apparatus 100 are discussed in greater detail with respect to the method 400 depicted in FIG. 4. It should be understood that the method 400 may include additional operations and that some of the operations described therein may be removed and/or modified without departing from the scopes of the method 400. The descriptions of the method 400 are made with reference to the features depicted in FIGS. 1-2 for purposes of illustration.

FIG. 4 depicts a flow diagram of an example method 400 for automatically restoring backed-up data to an apparatus 100. As shown in FIG. 4, at block 402, the processor 202 may access data, at a remote apparatus (such as apparatus 100), that is to be backed up. In some examples, the processor 202 may be implemented as part of a backup storage system (such as backup storage system 251). In these examples, the data to be backed up may be uploaded by the remote apparatus to the backup storage system.

At block 404, the processor 202 may cause a backup copy of the data to be stored at the backup storage system. At block 406, the processor 202 may determine that a restoration of the backup copy to the remote apparatus is to be performed without a user intervention that requests the restoration from the backup storage system. At block 408, the processor 202 may provide the backup copy of the data to the remote apparatus responsive to the determination that the restoration of the backup copy to the remote apparatus is to be performed.

In some examples, the processor may identify a location of the remote apparatus from which the data originated (such as on a local filesystem 201 of the apparatus 100) and cause the backup copy to be restored to the location. In these examples, the backup storage system 251 may have write access to the location and may write the backup copy to the location. In other examples, the processor may identify a temporary location (such as temporary restored data 205 of the apparatus 100) other than the location of the local data. In these examples, the backup storage system 251 may have write access to the temporary location and cause the backup copy of the data to be restored to the temporary location.

Some or all of the operations set forth in the method 400 may be included as utilities, programs, or subprograms, in any desired computer accessible medium. In addition, the method 400 may be embodied by computer programs, which may exist in a variety of forms. For example, some operations of the method 400 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

FIG. 5 depicts a block diagram of an example non-transitory machine-readable storage medium 500 for automatically restoring data backed up at a remote backup storage system (such as backup storage system 251). The non-transitory machine-readable storage medium 500 may be an electronic, magnetic, optical, or other physical storage device that includes or stores executable instructions. The non-transitory machine-readable storage medium 500 may be, for example, Random Access memory (RAM), an Electrically Erasable Programmable Read-Only Memory (EEPROM), a storage device, an optical disc, and the like. The non-transitory machine-readable storage medium 500 may have stored thereon machine-readable instructions 502-512 that a processor, such as the processor 102, may execute.

The machine-readable instructions 502 may cause the processor to determine that local data has changed relative to a previous backup. For example, the local data may include a file that has been previously backed up to a backup storage system. An indication of the previous backup of the local data may be accessed from the backup manifest 203. The backup manifest 203 may store a hash of the local data that was previously backed up. The hash of the local data may be generated based on a hash function, which may be a function that may map data onto data (a hash) of a fixed size. The hash function may therefore generate a hash that may change as the underlying data on which the hash function operates changes. For example, a hash of data that has changed may be different than a hash of the original data. Any hash function may be used so long as the resulting hash is dependent on the input data on which the hash function operates. Examples of hash functions include a cyclic redundancy check (CRC) hash function, a secure hash algorithm (SHA) hash function, and/or other types of hash functions.

In some examples, the processor may determine that the local data has been changed by comparing the hash from the backup manifest 203 with a current hash of the local data. For example, the processor may generate a current hash of the local data using the same hashing function used to generate the hash of the previous backup. The processor may determine that the local data has changed when the current hash does not match the hash of the previous backup. It should be noted that for systems that use file snapshots that save only deltas, or changes, made since a prior snapshot, the processor may determine that the local data has been changed when a new snapshot for the local data has been created or is to be created.

The machine-readable instructions 504 may cause the processor to transmit a backup copy of the local data to a remote backup storage system. For example, responsive to the determination that the local data has changed, the processor may transmit a copy of the local data (the "backup copy") to the remote backup storage system. In this manner, updated versions of the local data may be periodically backed up, which may be automatic by the apparatus or on-demand based on a user request to perform a backup.

The machine-readable instructions 506 may cause the processor to determine that the backup copy is to be restored from the remote backup storage system without a user intervention that requests that the backup copy is to be restored from the remote backup storage system. The machine-readable instructions 508 may cause the processor to transmit, to the remote backup storage system, a request to restore the backup copy. The machine-readable instructions 510 may cause the processor to receive the backup copy from the remote backup storage system. The machine-readable instructions 512 may cause the processor to store the backup copy to replace the local data. In some examples, the processor may identify a location of the local data (such as on a local filesystem 201 of the apparatus 100) and cause the backup copy to be restored to the location. In other examples, the processor may identify a temporary location (such as temporary restored data 205 of the apparatus 100) other than the location of the local data. In these examples, the backup copy may be restored from the temporary location without a network connection to the remote backup storage system.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored instructions that when executed by the processor, cause the processor to:
   cause a backup copy of local data to be stored in a remote backup storage system;
   determine that an accidental permanent deletion of the local data was performed;
   in response to the determination that the accidental permanent deletion of the local data was performed, determine that the backup copy is to be restored from the remote backup storage system to the apparatus without a user intervention;
   transmit, to the remote backup storage system, a request to restore the backup copy; and
   receive the backup copy from the remote backup storage system.

2. The apparatus of claim 1, wherein the instructions, when executed by the processor, cause the processor to:
   identify a location of the local data; and
   cause the backup copy to be restored to the location of the local data.

3. The apparatus of claim 1, wherein the instructions, when executed by the processor, cause the processor to:
   identify a temporary location; and
   store the backup copy of the local data at the temporary location.

4. The apparatus of claim 3, wherein the instructions, when executed by the processor, cause the processor to:
   determine that the backup copy is to be restored from the temporary location;
   identify a location of the local data; and
   restore the backup copy to the location of the local data from the temporary location.

5. The apparatus of claim 4, wherein the backup copy is restored from the temporary location to the location of the local data without a network connection to the remote backup storage system.

6. The apparatus of claim 1, wherein to determine that the accidental permanent deletion of the local data was performed, the instructions, when executed by the processor, cause the processor to:
   access a user interaction pattern that indicates that the accidental permanent deletion of the local data was performed.

7. The apparatus of claim 1, wherein the instructions, when executed by the processor, cause the processor to:

attempt to access the local data; and
determine that the local data is corrupted based on the attempted access, wherein the determination that the backup copy is to be restored from the remote backup storage system is based on the determination that the local data is corrupted.

8. The apparatus of claim 1 wherein the instructions, when executed by the processor, cause the processor to:
determine that the local data is unavailable or missing, wherein the determination that the backup copy is to be restored from the remote backup storage system is based on the determination that the local data is unavailable or missing.

9. The apparatus of claim 1, wherein the instructions, when executed by the processor, cause the processor to:
determine that the local data has been encrypted, wherein the determination that the backup copy is to be restored from the remote backup storage system is based on the determination that the local data has been encrypted.

10. The apparatus of claim 1, wherein the apparatus is a replacement apparatus that replaced a prior apparatus, and wherein the instructions, when executed by the processor, cause the processor to:
identify a prior backup copy of prior local data stored at the prior apparatus;
determine that the prior backup copy is to be restored from the remote backup storage system without a user intervention that requests that the prior backup copy be restored from the remote backup storage system;
transmit, to the remote backup storage system, a second request to restore the prior backup copy; and
receive the prior backup copy from the remote backup storage system.

11. A method comprising:
causing, by a processor of an apparatus, a backup copy of local data to be stored at a remote backup storage system;
determining that an accidental permanent deletion of the local data was performed;
in response to the determination that the accidental permanent deletion of the local data was performed determining, by the processor, that a restoration of the backup copy front the remote backup storage system to the apparatus is to be performed without a user intervention that requests the restoration from the remote backup storage system; and
receive, by the processor, the backup copy of the local data from the remote backup storage system to the apparatus responsive to the determination that the restoration of the backup copy to the apparatus is to be performed.

12. The method of claim 11, further comprising:
identifying a location of the apparatus from which the local data originated; and
causing the backup copy of the local data to be restored to the location.

13. The method of claim 11, further comprising:
identifying a temporary location of the apparatus;
causing the backup copy received from the remote backup storage system to be stored in the temporary location; and
causing the backup copy to be restored to a location of the local data from the temporary location.

14. A non-transitory computer readable medium storing machine readable instructions that when executed by a processor of an apparatus, cause the processor to:
transmit a backup copy of local data to a remote backup storage system;
determine that the local data has changed relative to the backup copy, including determining that an accidental permanent deletion of the local data was performed;
in response to the determination that the accidental permanent deletion of the local data was performed, determine that the backup copy is to be restored from the remote backup storage system without a user intervention;
transmit, to the remote backup storage system, a request to restore the backup copy;
receive the backup copy from the remote backup storage system; and
store the backup copy to replace the local data.

15. The non-transitory computer readable medium of claim 14, wherein the instructions, when executed by the processor, cause the processor to:
identify a location of the local data; and
cause the backup copy to be restored to the location of the local data.

16. The non-transitory computer readable medium of claim 14, wherein the instructions, when executed by the processor, cause the processor to:
identify a temporary location on the apparatus; and
store the backup copy at the temporary location.

17. The non-transitory computer readable medium of claim 16, wherein the instructions, when executed by the processor, cause the processor to:
receive a user request to obtain the backup copy of the local data;
identify a location of the local data; and
restore the backup copy to the location of the local data from the temporary location.

18. The non-transitory computer readable medium of claim 17, wherein the backup copy is restored from the temporary location to the location of the local data without a network connection to the remote backup storage system.

19. The non-transitory computer readable medium of claim 14, wherein to determine that the accidental permanent deletion of the local data was performed, the instructions, when executed by the processor, cause the processor to:
access a user interaction pattern indicating that the local data was accidentally permanently deleted.

20. An apparatus comprising:
a processor; and
a non-transitory computer readable medium on which is stored instructions that when executed by the processor, cause the processor to:
cause a backup copy of local data to be stored in a remote backup storage system;
determine that the backup copy is to be restored from the remote backup storage system to the apparatus without a user intervention;
transmit, to the remote backup storage system, a first request o restore the backup copy; and.
receive the backup copy from the remote backup storage system,
wherein the apparatus is a replacement apparatus that replaced a prior apparatus, and wherein the instructions, when executed by the processor, cause the processor to:
identify a prior backup copy of prior local data stored at the prior apparatus;
determine that the prior backup copy is to be restored from the remote backup storage system without a user intervention that requests that the prior backup copy be restored from the remote backup storage system;

transmit, to the remote backup storage system, a second request to restore the prior backup copy; and receive the prior backup copy from the remote backup storage system.

\* \* \* \* \*